(12) United States Patent  (10) Patent No.: US 7,506,541 B2
Woodard et al.  (45) Date of Patent: Mar. 24, 2009

(54) SYSTEM AND METHOD FOR WIRELESSLY DETERMINING FLUID VOLUME

(75) Inventors: Stanley E. Woodard, Hampton, VA (US); Bryant D. Taylor, Smithfield, VA (US)

(73) Assignee: The United States of America as represented by the National Aeronautics and Space Administration, Washington, DC (US)

( * ) Notice: Subject to any disclaimer, the term of this patent is extended or adjusted under 35 U.S.C. 154(b) by 282 days.

(21) Appl. No.: 11/328,468

(22) Filed: Jan. 9, 2006

(65) Prior Publication Data

US 2007/0157718 A1   Jul. 12, 2007

(51) Int. Cl.
*G01F 17/00* (2006.01)
*G01F 23/28* (2006.01)
(52) U.S. Cl. .................................. 73/149; 73/304 R
(58) Field of Classification Search ............. 73/149, 73/304 C, 304 R
See application file for complete search history.

(56) References Cited

U.S. PATENT DOCUMENTS

| 3,343,415 | A |   | 9/1967 | Johnston et al. |
| 4,122,718 | A |   | 10/1978 | Gustafson |
| 4,433,577 | A |   | 2/1984 | Khurgin et al. |
| 4,553,434 | A |   | 11/1985 | Spaargaren |
| 4,935,727 | A | * | 6/1990 | Re Fiorentin et al. ....... 340/618 |
| 5,001,596 | A |   | 3/1991 | Hart |
| 5,103,368 | A |   | 4/1992 | Hart |
| 5,124,933 | A |   | 6/1992 | Maier |
| 5,437,184 | A |   | 8/1995 | Shillady |
| 6,293,142 | B1 |   | 9/2001 | Pchelnikov et al. |
| 6,335,690 | B1 | * | 1/2002 | Konchin et al. ............. 340/618 |
| 6,516,661 | B1 | * | 2/2003 | Spillman et al. ............... 73/149 |
| 6,539,797 | B2 |   | 4/2003 | Livingston et al. |
| 6,564,658 | B2 |   | 5/2003 | Pchelnikov et al. |
| 6,677,859 | B1 |   | 1/2004 | Bensen |
| 6,802,205 | B2 |   | 10/2004 | Barguirdjian et al. |
| 6,823,730 | B2 |   | 11/2004 | Buck et al. |
| 2001/0037680 | A1 |   | 11/2001 | Buck et al. |
| 2003/0000303 | A1 |   | 1/2003 | Livingston et al. |
| 2003/0019291 | A1 |   | 1/2003 | Pchelnikov et al. |
| 2004/0004545 | A1 |   | 1/2004 | Early |
| 2004/0004550 | A1 |   | 1/2004 | Early |
| 2004/0004551 | A1 |   | 1/2004 | Early |
| 2004/0078014 | A1 |   | 4/2004 | Shapira |
| 2005/0007239 | A1 |   | 1/2005 | Woodard et al. |
| 2005/0017711 | A1 |   | 1/2005 | Woodard et al. |

FOREIGN PATENT DOCUMENTS

JP   2005-315774   * 11/2005   ............... 73/149

* cited by examiner

*Primary Examiner*—Daniel S Larkin
(74) *Attorney, Agent, or Firm*—Robin W. Edwards

(57) ABSTRACT

A system and method are provided for determining the volume of a fluid in a container. Sensors are positioned at distinct locations in a container of a fluid. Each sensor is sensitive to an interface defined by the top surface of the fluid. Interfaces associated with at least three of the sensors are determined and used to find the volume of the fluid in the container in a geometric process.

16 Claims, 2 Drawing Sheets

US 7,506,541 B2

SYSTEM AND METHOD FOR WIRELESSLY DETERMINING FLUID VOLUME

ORIGIN OF THE INVENTION

The invention described herein was made in part by an employee of the United States Government and may be manufactured and used by or for the Government of the United States of America for governmental purposes without the payment of any royalties thereon or therefor.

BACKGROUND OF THE INVENTION

1. Field of the Invention

This invention relates to the determination of fluid volume. More specifically, the invention is a wireless method and system for determining the volume of a fluid in a container in a wireless fashion regardless of the container's orientation.

2. Description of the Related Art

A variety of systems and methodologies are known for measuring the amount of fluid in a container. In static or nearly static systems, it is generally sufficient to measure the level of fluid in the container. However, in dynamic systems where a container's orientation is frequently changing, the fluid level or height at a measurement location in the container can change drastically from orientation to orientation. In such cases, fluid volume must be determined. Furthermore, if the fluid is volatile (e.g., fuel), the fluid volume measurement system is preferably one that cannot introduce an electric discharge into the fluid under any operating or malfunctioning condition.

SUMMARY OF THE INVENTION

Accordingly, it is an object of the present invention to provide a system and method for determining the fluid volume in a container.

Another object of the present invention is to provide a system and method for determining the volume of fluid in a container that undergoes changes in orientation.

Still another object of the present invention is to provide a system and method for determining the volume of fluid in a container in a way that eliminates the possibility of any electrical discharge into the fluid.

Other objects and advantages of the present invention will become more obvious hereinafter in the specification and drawings.

In accordance with the present invention, a system and method are provided for determining the volume of a fluid in a container. A plurality of sensors are positioned in a container of a fluid. Each sensor spans at least a portion of a dimension of interest in the container at a distinct location in the container. Each sensor is sensitive to an interface (e.g., a liquid/gas interface) defined by the top surface of the fluid. The interface associated with at least three of the sensors is determined using a wireless measurement acquisition system. Volume of the fluid in the container is determined in a geometric process using the interfaces determined from three (or more) sensors.

DETAILED DESCRIPTION OF THE INVENTION

The present invention's system and method of determining fluid volume in a container uses a wireless fluid-level measurement system disclosed in U.S. Patent Publication No. 2005/0007239, issued as U.S. Pat. No. 7,086,593 B2, the entire contents of which are hereby incorporated by reference. In general, this publication describes a measurement system utilizing a fluid-level sensor that is either a passive capacitive-inductive circuit or capacitive-inductive-resistive circuits that produce a magnetic field in response to being electrically excited via Faraday induction. The magnetic field response attributes correspond to values of physical properties that the sensor measures. The term "magnetic field response sensor" is used herein to mean sensors that are interrogated using the described method. This publication further describes different embodiments of magnetic field response fluid-level sensors.

Figure 1:
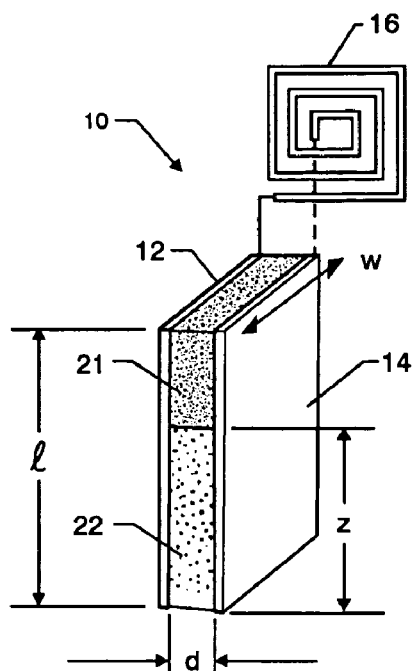
FIG. 1 is a schematic view of a fluid-level sensor that can be used in the present invention's wireless determination of fluid volume.

For a more complete understanding of the present invention, the concepts disclosed in 2005/0007239 will be described herein. For example, FIG. 1 illustrates a fluid-level sensor 10 consisting of two parallel electroplates 12/14 and a spiral inductor 16. In the illustration, sensor 10 is completely immersed in two dielectric media. A medium 22 (e.g., a liquid) of dielectric constant $\kappa_2$ fills the lower portion of the gap between the electric plates to level z. The remaining portion of the gap is filled with a medium 21 (e.g., typically air or some other gas) of dielectric constant $\kappa_1$. The density of medium 22 is far greater than that of medium 21 and $\kappa_2 >> \kappa_1$. In general, if the two media are either non-mixing liquids, solids or gases, the result is stratification of the media with medium 22 filling the bottom portion of the electroplate gap. The capacitance C(z) is dependent upon the level z and is the summed capacitance due to both dielectric media. Plates 12/14 act as a parallel plate capacitor since they share the same electric field. Hence the capacitance C(z) is $$C(z) = C_{\kappa 1} + C_{\kappa 2} \qquad (1)$$
$$= (\ell - z)\frac{\varepsilon_0 w \kappa_1}{d} + \frac{\varepsilon_0 w \kappa_2}{d} z$$
$$= \frac{\varepsilon_0 w}{d}[\ell \kappa_1 + (\kappa_2 - \kappa_1)z]$$

The key design parameters of this embodiment are total length l of plates 12/14, width of the plates w, separation of the plates d, and the dielectric constants $\kappa_2$ and $\kappa_1$. The permittivity constant $\varepsilon_0$ is $8.85 \times 10^{-12}$ F/m. When the capacitor gap is completely filled with dielectric medium 21 (i.e., z=0), the capacitance is $$C(z) = \frac{\varepsilon_0 w \ell \kappa_1}{d}$$

If the capacitor gap is completely filled with medium 22 (i.e., z=1), the capacitance is $$C(z) = \frac{\varepsilon_0 w \ell \kappa_2}{d}$$

When the electroplate capacitor is electrically coupled to inductor 16, the resulting circuit forms a passive inductance-capacitance circuit. The resonant electrical frequency of the circuit is $$\omega = \frac{1}{\sqrt{LC(z)}} \quad (2)$$

where L is the inductance of inductor 16. Although a square spiral is shown, other inductor designs can be used without departing from the scope of the present invention. Further, an electrically-resistive element whose resistance changes with some physical parameter of interest could be placed in the inductance-capacitance circuit (e.g., in series, in parallel). This would allow the system to acquire other measurements ancillary to the fluid volume determination.

Substituting equation (1) for capacitance into that for the resonant frequency equation (2) results in the following expression which relates the resonant frequency to immersion depth $$\omega = \left[\frac{L\varepsilon_0 w}{d}[\ell\kappa_1 + (\kappa_2 - \kappa_1)z]\right]^{-1/2} \quad (3)$$

Accordingly, there is a unique frequency ω for any level z of medium 22 such that $$\omega_U > \omega > \omega_L$$

where the upper frequency value $\omega_U$ is the resonant frequency when the sensor's capacitive plates are completely immersed in medium 21, and the lower frequency value $\omega_L$ is the resonant frequency when the sensor's capacitive plates are completely immersed in medium 22. The expressions for $\omega_U$ and $\omega_L$ can be written as $$\omega_U = \left[\frac{L\varepsilon_0 w\ell\kappa_1}{d}\right]^{-1/2}$$

and $$\omega_L = \left[\frac{L\varepsilon_0 w\ell\kappa_2}{d}\right]^{-1/2}$$

respectively.

When air is dielectric medium 21 in the upper portion of the gap, then $\kappa_1 = 1$.

Figure 2:
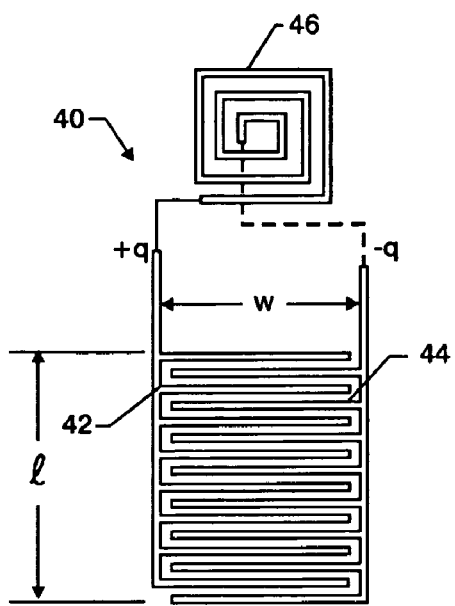
FIG. 2 is a schematic view of another embodiment of a fluid-level sensor that can be used in the present invention.

A similar analysis can be applied to other types of magnetic field response sensors as disclosed in U.S. Patent Publication No. 2005/0007239. For example, the present invention could also utilize a sensor 40 having its capacitor formed by interdigitated electrodes 42 and 44 as shown in FIG. 2. The electrodes are coupled to an inductor 46 which, through Faraday induction, will cause the positive or negative charging of the electrodes.

In accordance with the present invention, three or more fluid-level sensors such as those shown in FIGS. 1 and 2 are positioned in a container and are "interrogated" using a measurement acquisition system (i.e., a magnetic field response recorder as described in detail in the afore-cited publication number 2005/0007239). As will be explained further below, the three or more sensors should be positioned at distinct locations in the container. Although not a requirement of the present invention, the sensors could be placed adjacent to interior walls of the container so that they can be coupled thereto for the support thereof. In situations where the interior walls of the container are made from an electrically non-conductive material, the sensor circuitry can be deposited (e.g., using thin-film deposition techniques) directly onto the container's interior walls.

Figure 3:
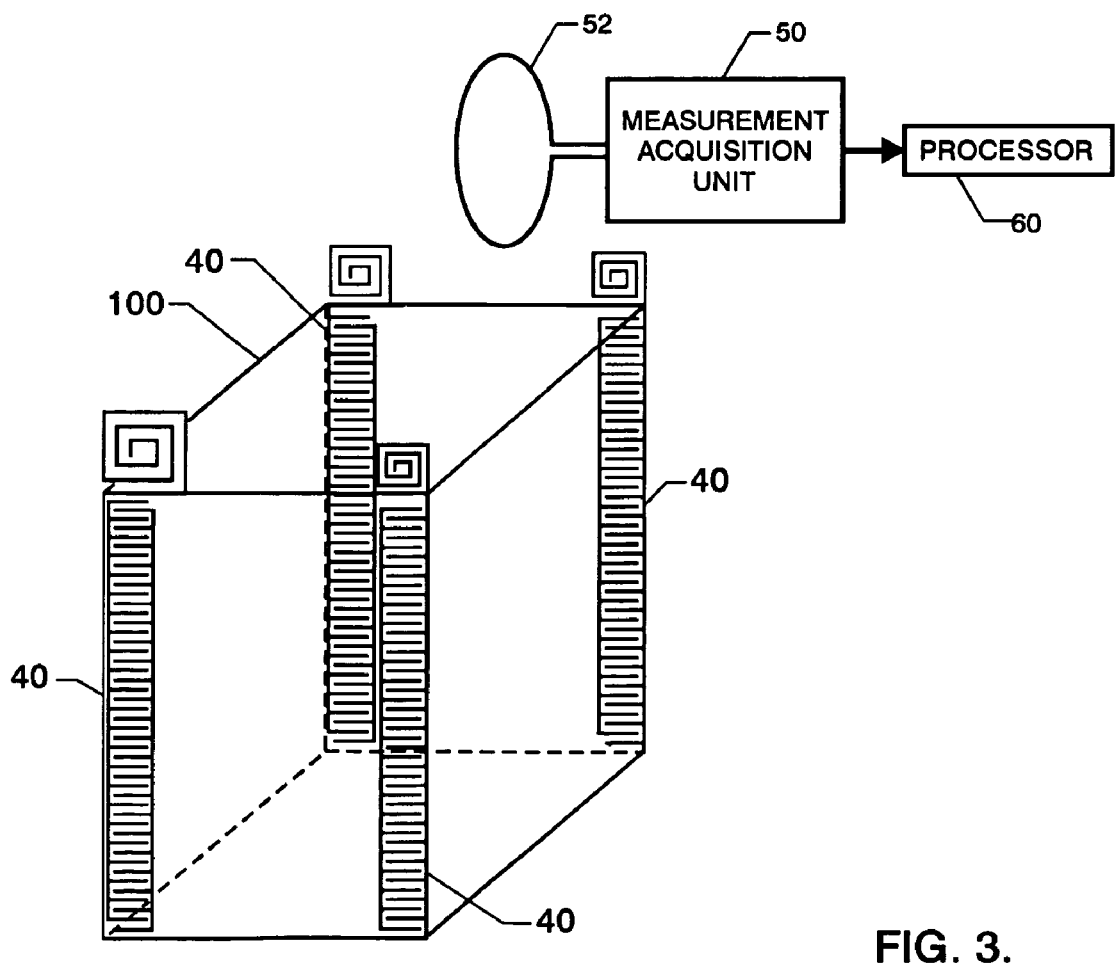
FIG. 3 is a schematic view of a sensor array and measurement acquisition system used to determine the volume of fluid in a container in accordance with the present invention.

By way of illustrative example, FIG. 3 shows four fluid-level sensors (e.g., sensor 40 shown in FIG. 2) placed inside a container 100 along a dimension of interest (e.g., the height) of the container at a desired or normal orientation thereof. For ease of illustration, sensors 40 are positioned at the vertical edges of container 100 and span the fillable height thereof or whatever the height of interest may be. While a box-shaped container will be used in this discussion, the size and shape of the container are not limitations of the present invention. Further, as mentioned earlier, the sensors can be directly deposited to non-conductive surfaces or regions of container 100 resulting in extremely lightweight sensors. The four sensor array shown in FIG. 3 allows fluid to contact at least three sensors during any roll or pitch motion of container 100. At any orientation of container 100, the frequency of each sensor 40 corresponds to a fluid level defined by the interface between the fluid in container 100 and the non-mixing medium (e.g., air) above the fluid.

The other component of the present invention's fluid volume determination system is measurement acquisition system 50 that includes one or more antennas 52 for transmitting and receiving RF energy regulated by system 50. A processor 60 coupled to or integrated with system 50 analyzes the RF signals received. The range of each sensor's resonant frequency corresponds to the range of values representing no exposure to fluid to complete exposure to fluid. The inductance of each sensor is set so that the frequency range of one sensor does not overlap that of the other.

Each sensor can measure fluid immersion level individually. The present invention uses three sensor measurements when the top fluid surface is not parallel to the local horizon (e.g., during roll or pitch of container 100). Three measurements are used to identify the orientation of the top surface of the fluid. If fluid is in contact with four sensors, only measurements from three are required. The frequency of each sensor corresponds to an interface on each sensor between the fluid and the medium above the fluid. In other words, a sensor's interface is indicative of the top surface of the fluid on that sensor. Geometrically, three such interfaces can be used to develop an equation of the fluid's upper surface plane. Once this equation is developed, it can be used with the area under the plane to determine fluid volume.

Figure 4:
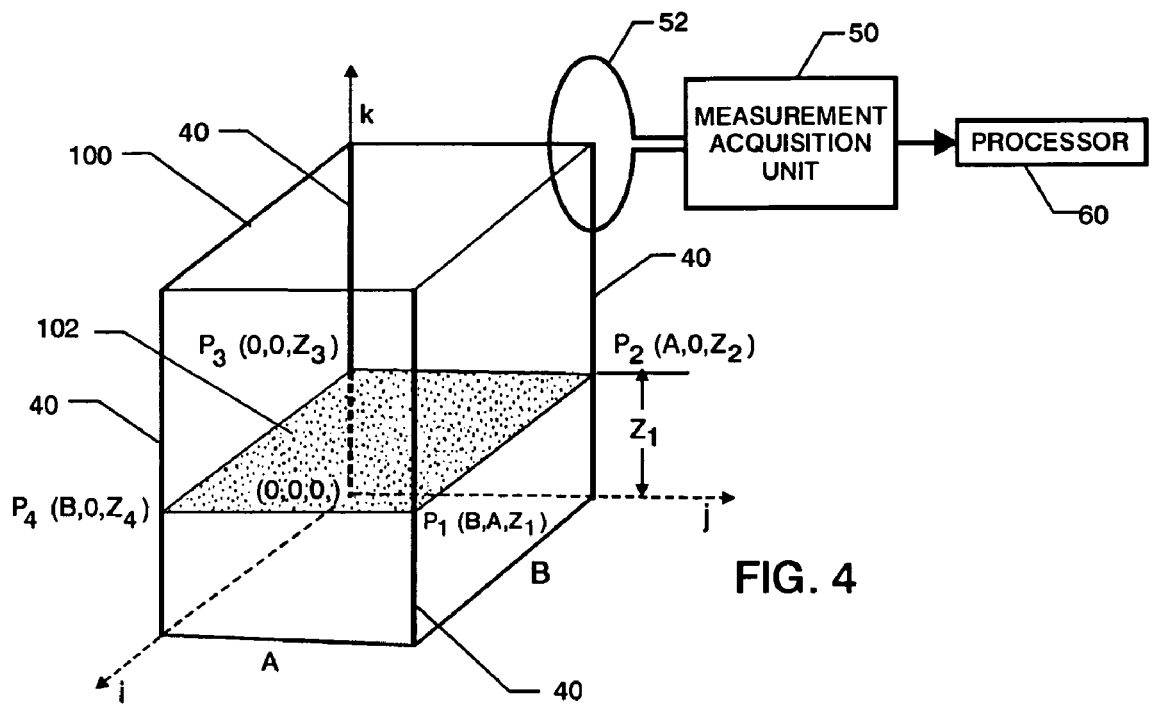
FIG. 4 is a schematic view of the container referenced to a three-dimensional coordinate system.

The above-described sensor array referenced to a local horizon coordinate system $(\hat{i}, \hat{j}, \hat{k})$ is shown in FIG. 4 where, for clarity of illustration, thick black vertical lines are used to represent sensors 40. Container 100 is shown to contain an arbitrary fuel level $z_i$ when the i-j plane is parallel with the local horizon. The top surface plane of the fluid is indicated by plane 102. Geometric attributes of container 100 are annotated and the four fluid interfaces on sensors 40 are referenced as points $P_1$ to $P_4$ along with their respective (i, j, k) coordinates. Sensors 40 are interrogated by system 50 and at least three measurements are selected to determine volume.

Each of sensors 40 is interrogated to see if there is a fluid interface (e.g., a fluid/air interface when air is in the container above the fluid) on the sensor. That is, for the i-th sensor, if $\omega_i = \omega_{iU}$ the i-th sensor is not exposed to fluid. The interrogation process is repeated until at least three sensors are selected that have a fluid interface (i.e., $\omega_{iL} < \omega_i < \omega_{iU}$). Measurements for three sensors are needed to define top surface plane 102 of the fluid.

The local vertical coordinate $z_n$ for the fuel/air interface point $P_n$ for the n-th sensor is given by $$z_n = \frac{1}{(\kappa_2 - \kappa_1)} \left[ \frac{d\omega_n^2}{L\varepsilon_0 w} - \ell\kappa_1 \right] \quad n = 1, 2, 3. \tag{4}$$

Assuming points $P_1$-$P_3$ define fluid interfaces, two vectors can be used to define the normal to the top surface plane 102 as follows $$\overrightarrow{P_1P_2} = (x_2-x_1)\hat{i}_1 + (y_2-y_1)\hat{j}_1 + (z_2-z_1)\hat{k}_1$$

and $$\overrightarrow{P_1P_3} = (x_3-x_1)\hat{i}_1 + (y_3-y_1)\hat{j}_1 + (z_3-z_1)\hat{k}_1$$

The resulting surface normal is $$\vec{N} = \overrightarrow{P_1P_2} \times \overrightarrow{P_1P_3}$$
$$= (y_2 - y_1)(z_3 - z_1) - (z_2 - z_1)(y_3 - y_1)\hat{i}_1 + (z_2 - z_1)(x_3 - x_1) -$$
$$(x_2 - x_1)(z_3 - z_1)\hat{j}_1 + M\hat{k}_1$$

where $$M = (x_2-x_1)(y_3-y_1) - (y_2-y_1)(x_3-x_1)$$

Using $P_1$ and $\vec{N}$, the surface plane equation is $$z = z_1 - \frac{1}{M}[(y_2 - y_1)(z_3 - z_1) - (z_2 - z_1)(y_3 - y_1)](x - x_1) -$$
$$\frac{1}{M}[(z_2 - z_1)(x_3 - x_1) - (x_2 - x_1)(z_3 - z_1)](y - y_1)$$

The volume V in the tank is determined by integrating the area under plane 102 as follows $$V = \int_x \int_y z \, dy \, dx \tag{5}$$

Figure 5:
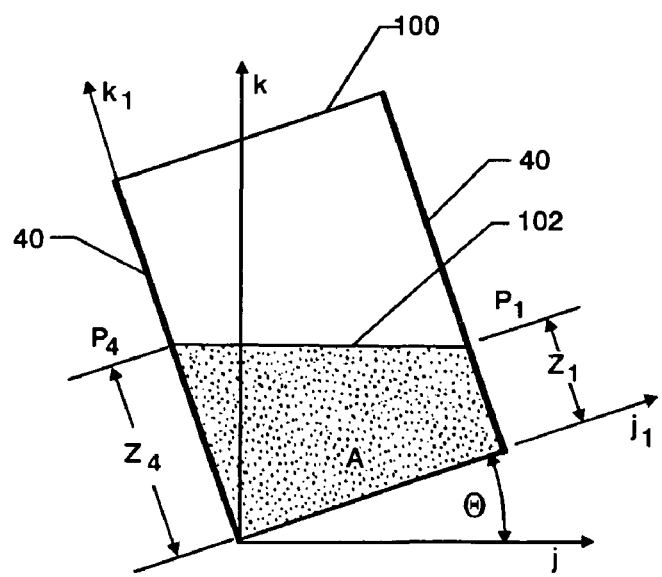
FIG. 5 is a schematic view of the container in FIG. 4 rotated through an angle relative to one axis of the coordinate system.

An example of the present invention will now be explained with the aid of FIG. 5 where container 100 has been rotated about the $\hat{i}$-axis by an angle $\theta$. A local coordinate system ($\hat{i}_1$, $\hat{j}_1$, $\hat{k}_1$) that rotates with container 100 is also shown. The coordinates of the fluid interface points are $P_1(B, A, z_1)$, $P2(0, A, z_2)$, $P_3(0, 0, z_3)$ and $P4(B, 0, z_4)$. The example assumes that interface points $P_2$, $P_3$ and $P_4$ are identified for use. Two vectors $\overrightarrow{P_2P_3}$ and $\overrightarrow{P_2P_4}$ can be used to define the top surface of the fluid. Note that for a simple single-axis rotation, $z_4 = z_3$ and $z_2 = z_1$. The two vectors $\overrightarrow{P_2P_3}$ and $\overrightarrow{P_2P_4}$ are given by $$\overrightarrow{P_2P_3} = -A\hat{j}_1 + (z_3-z_2)\hat{k}_1$$

and $$\overrightarrow{P_2P_4} = B\hat{i}_1 - A\hat{j}_1 + (z_4-z_2)\hat{k}_1$$

The surface normal is given by $$\vec{N} = \overrightarrow{P_2P_3} \times \overrightarrow{P_2P_4} = A(z_4-z_3)\hat{i}_1 - B(z_3-z_2)\hat{j}_1 - BA\hat{k}_1$$

Point $P_2$ and $\vec{N}$ can be used to develop a plane equation for the fluid's top surface plane 102 as follows $$z = \frac{-(y - A)}{A}(z_3 - z_2) + z_2$$

The volume V within container 100 is then determined as follows $$V = \int_x \int_y z \, dy \, dx = \int_x \int_y \left[ \frac{-(y-A)}{A}(z_3 - z_2) + z_2 \right] dy \, dx \tag{6}$$
$$= \int_x \left[ \frac{-\left(\frac{y^2}{2} - Ay\right)}{A}(z_3 - z_2) + z_2 y \right]_0^A dx$$
$$= \int_x \left[ \frac{A}{2}(z_3 - z_2) + Az_2 \right]_0^A dx$$
$$= \left[ \frac{A}{2}(z_3 - z_2)x + Az_2 x \right]_0^B$$
$$= \left[ \frac{AB}{2}(z_3 - z_2) + ABz_2 \right]$$

Note that $z_3$ and $z_2$ are derived from frequency measurements $\omega_3$ and $\omega_2$ using equation (4).

The advantages of the present invention are numerous. The use of magnetic fields to power the sensors and to acquire measurements from the sensors eliminates the need for physical connection from the sensor to a power source and data acquisition equipment. Once electrically excited, the sensors generate very low voltage. Even if a short does occur in the sensor, the sensor cannot be activated because a completed circuit is needed for Faraday induction. Hence, electrical arcing is prevented. The system also eliminates the need to have a data acquisition channel dedicated to each sensor. No mechanical parts are needed to measure fluid volume, thereby reducing overall system weight, reducing measurement complexity and probability of failure, and reducing measurement error due to mechanical part wear. The measurement acquisition system and sensors are extremely lightweight. When sensors are directly deposited onto the container's inner surface, the number of measurements can be greatly increased while alleviating weight. Thus, there is no weight penalty for increasing the number of measurements.

While the present invention can be used in any fluid volume determination application, it will provide substantial advantages when the fluid is a volatile fuel stored in a vehicle's tank that experiences change in orientation during vehicle operation. Examples could include aircraft fuel tanks that experience roll and pitch maneuvers, boat fuel tanks in heavy waves, and trucks and automobiles moving on steep roads. When used for spacecraft or military combat aircraft, two arrays similar to the single array shown in FIG. 3 can be oriented orthogonal to each other to facilitate measurement at all orientations. The method is applicable for any liquid fuel (e.g., petroleum, liquid hydrogen, liquid oxygen, etc.).

The present invention can be used in state-of-the-art aircraft avionics systems which must be ultra-reliable and meet very low levels of systems-failure risk. The wireless nature of the system alleviates many shortcomings of traditional avionics measurement systems that use wires. Eliminating wiring alleviates a number of potential wiring hazards, e.g., damaged wires becoming ignition sources due to arcing, wire fraying, chemical degradation of wire insulation, and wire splaying and wire chaffing. In the past, there have been many instances of spacecraft launch delays or aircraft fatalities that have been traced to wiring damage. Accordingly, the present invention sets a new standard for safety in fuel volume determination.

Although the invention has been described relative to a specific embodiment thereof, there are numerous variations and modifications that will be readily apparent to those skilled in the art in light of the above teachings. For example, when volatile fluids are involved, the interrogating antenna and acquisition electronics could be placed in an environmentally sealed and flame-retardant enclosure. In this way, even if the interrogating antenna(s) is subjected to a power surge, the fluid in the container would be isolated from any electrical sparks that might be generated by the interrogating antenna(s). Still further, in situations where the fluid container is placed beyond the functional range of the acquisition system's interrogating antenna, the sensors in the fluid container and the interrogating antenna could be functionally coupled by means of an inductive transformer placed therebetween. Again, if the fluids in the container are volatile, the inductive transformer could be placed in an environmentally sealed and flame-retardant enclosure. It is therefore to be understood that, within the scope of the appended claims, the invention may be practiced other than as specifically described.

What is claimed as new and desired to be secured by Letters Patent of the United States is:

1. A system for determining the volume of a fluid in a container, comprising:
   a plurality of sensors adapted to be positioned in a container of a fluid, each of said sensors spanning at least a portion of a dimension of interest in the container at a distinct location in the container, each of said sensors being sensitive to an interface defined by the top surface of the fluid;
   a measurement acquisition system for determining said interface from at least three of said sensors; and
   processing means coupled to said measurement acquisition system for determining a volume of the fluid in the container using said interface so-determined from said at least three of said sensors, wherein said volume is determined by integration of the area under the surface plane formed by said interfaces.

2. A system as in claim 1 wherein each of said sensors comprises a magnetic field response sensor having a unique resonant frequency range of operation.

3. A system as in claim 2 wherein said measurement acquisition system comprises a magnetic field response recorder.

4. A system as in claim 1 wherein each of said sensors is adapted to be coupled to the container.

5. A system as in claim 1 wherein each of said sensors is a circuit powered by Faraday induction.

6. A system as in claim 5 wherein said measurement acquisition system includes antenna means for transmitting radio frequency energy therefrom and for receiving radio frequency energy transmitted from each of said sensors.

7. A system for determining the volume of a fluid in a container, comprising:
   a plurality of sensors adapted to be coupled to interior walls of a container of a fluid, each of said sensors spanning a dimension of the container at a distinct location therein, each of said sensors being sensitive to an interface defined by the top surface of the fluid;
   a measurement acquisition system for determining said interface from at least three of said sensors with three corresponding ones of said interfaces being indicative of a surface plane equation that defines the top surface of the fluid; and
   processing means coupled to said measurement acquisition system for determining a volume of the fluid in the container by intestration of the area under said surface plane using said surface place equation.

8. A system as in claim 7 wherein each of said sensors comprises a magnetic field response sensor having a unique resonant frequency range of operation.

9. A system as in claim 8 wherein said measurement acquisition system comprises a magnetic field response recorder.

10. A system as in claim 7 wherein the interior walls of the container are electrically non-conductive, and wherein each of said sensors is deposited directly onto the interior walls of the container.

11. A system as in claim 7 wherein each of said sensors is a circuit powered by Faraday induction.

12. A system as in claim 11 wherein said measurement acquisition system includes antenna means for transmitting radio frequency energy therefrom and for receiving radio frequency energy transmitted from each of said sensors.

13. A method of determining the volume of a fluid in a container, comprising the steps of:
   positioning a plurality of sensors in a container of a fluid with each of said sensors spanning a dimension of interest in the container at a distinct location in the container, each of said sensors being sensitive to an interface defined by the top surface of the fluid;
   determining said interface from at least three of said sensors with three corresponding ones of said interfaces being indicative of a surface plane equation that defines the top surface of the fluid; and
   determining a volume of the fluid in the container by integration of the area under said surface plane using said surface plane equation.

14. A method according to claim 13 wherein each of said sensors comprises a magnetic field response sensor having a unique resonant frequency range of operation, and wherein said step of determining each said interface comprises the steps of:
   transmitting radio frequency energy in the vicinity of the container wherein each of said sensors resonates at a frequency from said unique resonant frequency range of operation associated therewith, said frequency being indicative of a location of said interface associated with a corresponding one of said sensors; and
   measuring each said frequency so-resonated.

15. A method according to claim 13 wherein said step of positioning comprises the step of coupling each of said sensors to an interior wall of the container.

16. A method according to claim 13 wherein interior walls of the container are electrically non-conductive. and wherein said step of positioning comprises the step of depositing each of said sensors directly onto portions of the interior walls of the container.

\* \* \* \* \*